Nov. 15, 1932.  D. SCIAKY  1,888,148

ELECTRIC WELDING MACHINE

Filed Nov. 11, 1930  3 Sheets-Sheet 1

Inventor:-
David Sciaky
by Langner, Parry, Card & Langner
Attys.

Nov. 15, 1932.  D. SCIAKY  1,888,148
ELECTRIC WELDING MACHINE
Filed Nov. 11, 1930  3 Sheets-Sheet 2
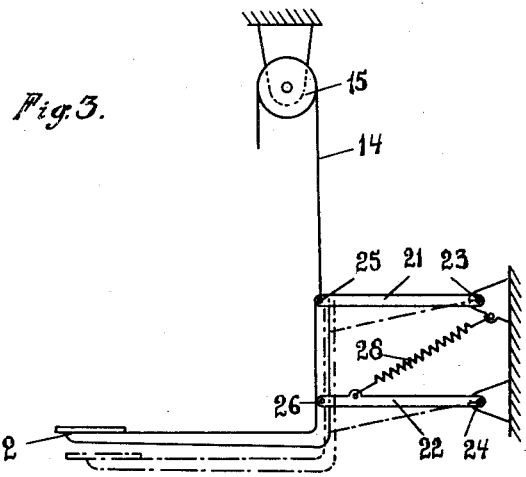
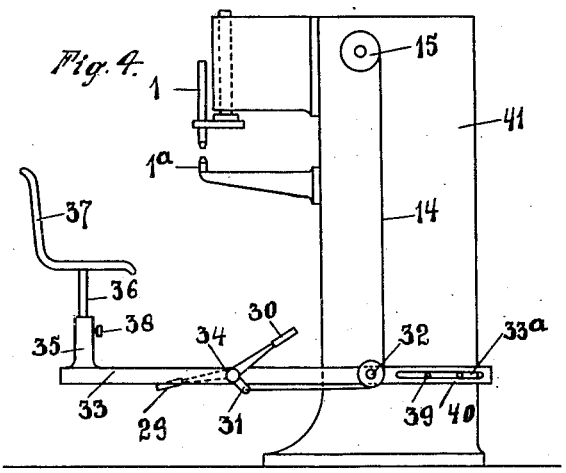
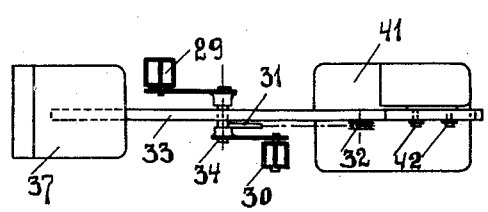

Nov. 15, 1932.  D. SCIAKY  1,888,148
ELECTRIC WELDING MACHINE
Filed Nov. 11, 1930  3 Sheets-Sheet 3
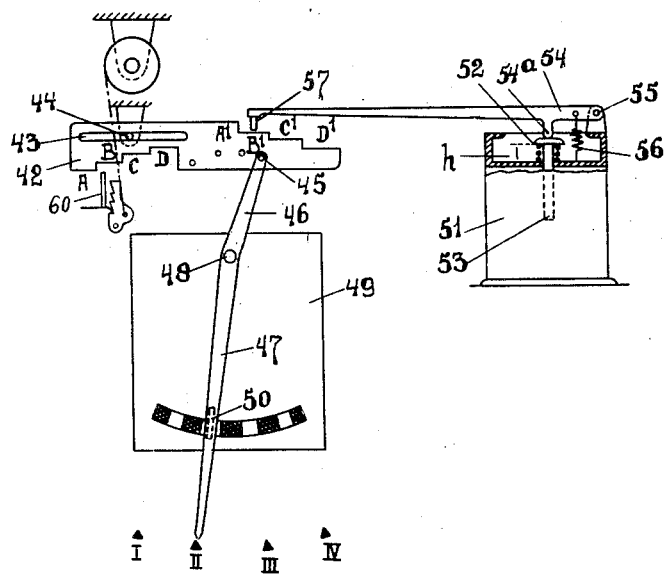
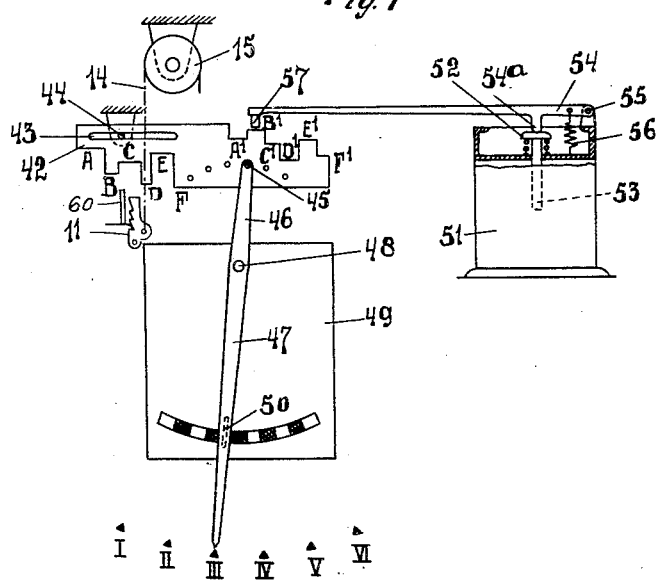
Inventor:-
David Sciaky
by Langner, Parry, ...
Attys.

Patented Nov. 15, 1932

1,888,148

UNITED STATES PATENT OFFICE

DAVID SCIAKY, OF PARIS, FRANCE

ELECTRIC WELDING MACHINE

Application filed November 11, 1930, Serial No. 494,933, and in France November 22, 1929.

The present invention has for its object improvements in electric welding machines and particularly in spot-welding machines.

Spot-welding machines are currently employed comprising two electrodes, the one fixed and the other movable, the movement of the movable electrode being produced by the pedal by means of lever systems or the like controlling at the same moment the closing of the welding circuit. These machines present certain disadvantages of which the principal ones are the folowing:

The pressure or the electrodes upon the work-piece is variable according as the said electrodes are closer or less close together.

The jointed lever attached to the pedal, when the dimensions of the work-pieces render its lengthening necessary, describes at its extremity, that is to say at the position of the pedal, a circular arc of an amplitude which most frequently is far greater than that of the movement of the foot. There results a lack of convenience for the operator, producing fatigue and therefore a reduction of output.

It is necessary likewise to mention the fact that the pedals of the known systems utilize the effort of the operator only partially and more particularly in an irrational manner. The pedal, by reason of the great amplitude of its movement, is necessarily at a relatively high position in relation to the ground, which in the first place compels the operator to raise his foot very high, and secondly makes it practically impossible for him to use the weight of his body directly. Moreover, the necessity of maintaining his foot in the air during the setting up of the work to be welded, an operation which is often much longer than that of the welding proper, increases the fatigue of the operator very rapidly.

Lastly in these machines, the number of parts to be adjusted in order to obtain satisfactory welding conditions of a given work-piece is relatively great. It is necessary in particular to regulate the pressure of the electrode upon the work, to set the switch which determines the voltage at the electrodes, and also to adjust the automatic switch, if the cut-off of the current after welding is to be effected automatically.

The invention consists, with the object of suppressing the first of these drawbacks, in utilizing for the production of the movement of the movable electrode of the welding machine, two conjugate levers, the one bringing the electrode rapidly into contact with the work-piece, and the other serving to establish the desired pressure of said electrode upon the work. These two levers are arranged in such a way that they act consecutively, the second lever coming into operation automatically when the first has brought the electrode into contact with the work-piece.

Moreover the pedal producing the movement of the levers is mounted in such a way that it rises and falls parallel to itself. Its length can thus be increased without thereby changing the relation of the lever arm, as happens in the case of pedals mounted in the customary manner.

Further, a single device controls simultaneously the adjustment of the different factors affecting the welding, namely the pressure of the electrodes upon the work, the intensity of the welding current and the duration of the passage of the said current.

The accompanying drawings represent diagrammatically, simply by way of example, different forms of carrying out the subject matter of the present invention.

Figure 3 is a view of a modification of the pedal.

Figure 4 is an elevation of an electric welding machine, in which the movements of the electrode are produced by means of a double pedal.

Figure 5 is a plan view of the said welding machine.

Figure 2:
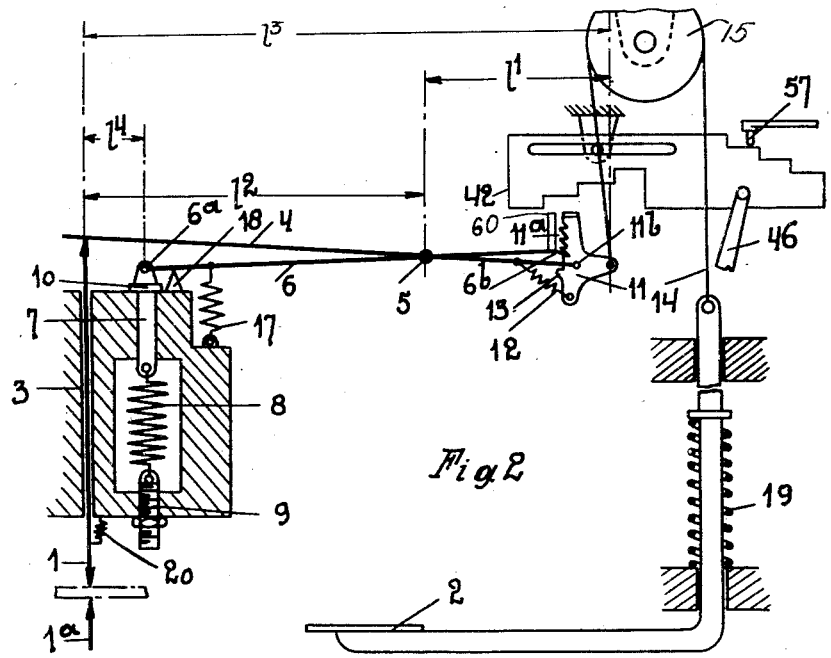
Figures 1 and 2 show, at two different stages of the operation, a lever device in accordance with the invention for operating the movable electrode.

Figures 6 and 7 separately represent an arrangement allowing the simultaneous regulation of the different factors affecting the welding of a given work-piece.

The movement of the movable electrode 1, which faces the stationary electrode 1a and which slides in the guide 3, is produced by the lever 4 pivoted at 5 upon a second lever 6. The extremity of the lever 4 is pivoted at 11b upon the member 11 which carries teeth 11a. In the position of rest a spring 12 maintains the beak 13 of the member 11 against lever 4; the hooked end 6b of the lever 6 is thus freed from the teeth 11a.

The extremity 6a of the lever 6 can pivot upon the head of the slide 7 held yieldingly downwards by a strong spring 8, the collar 10 limiting the stroke of the slide. The spring 8 is fixed at its other end to a screw 9 which allows of regulating the tension of the said spring.

The lever 6 is also maintained against the stop 18 by a spring 17.

To the member 11 there is fixed a cable 14 passing over the pulley 15, this cable being fixed at its other end to the pedal 2.

Figure 1:
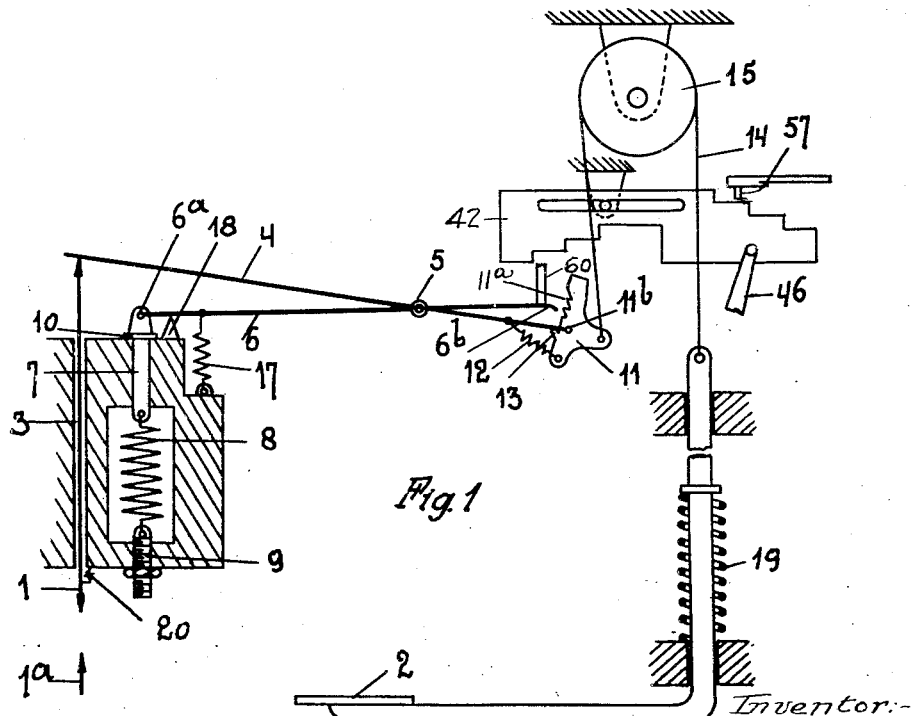

The springs 19 and 20 serve by returning the pedal and the movable electrode upwards, to bring the device into the position of rest (Figure 1). The adjustable stop 42 serves to limit the stroke of the extremity 6b of the lever 6 while the finger 60, carried by the extremity 6b of the said lever, comes into contact with the said stop.

This device operates in the following manner:

When pressure is applied to the pedal 2, the member 11 is urged upwards by the cable 14, and the lever 4 oscillating around the centre 5, which is then stationary, causes the movable electrode 1 to descend towards the workpiece.

When the movable electrode is in contact with the work-piece, it cannot move any further; upon continued pressure on the pedal, the spring 12, being less powerful than the spring 17, gives way and the member 11 pivots around the centre 11b, which brings about the engagement of the hook 6b with the teeth 11a.

From this moment onwards, the lever 6 is therefore rendered fast with the lever 4 (Figure 2); the levers 4 and 6 thus form a rigid group of which the pivot is at 6a, and the transmission ratio which was given by $l^2:l^1$ is now determined by $l^4:l^3$.

The spring 17 being stretched, the lever 6 rises from the stop 18, the slide 7 lifts bringing about the tensioning of the spring 8, and when the finger 20 comes into contact with the stop 42, there is obtained the desired pressure of the movable electrode upon the workpiece. This pressure is thus a function of the final value of the tension of the spring 8, and therefore of the stroke of the extremity 6b of the lever 6 which is regulated by means of the stop 42.

It is evident that the pressure at the electrodes will not change if these latter are worn or burnt away, nor if either the distance which separates them, or even the thickness of the work-piece varies.

Likewise, it follows from the foregoing statements that by selecting judiciously the ratios $l^2:l^1$ and $l^4:l^3$, it is possible to obtain by a relatively small force and short movement at the pedal, a relatively long stroke of the movable electrode and a relatively high pressure at the electrodes.

It is to be noted that the pedal lever shown, instead of performing a circular movement in the vertical plane as is the case for ordinary pedals, is displaced always in the same plane while remaining parallel to itself. Consequently any multiplication or demultiplication of the proportions of the lever arms as a function of the length of the pedal is suppressed. It is thus possible to lengthen the pedal according to the requirements of working, without there resulting therefrom an inconvenience due to an amplification of its movement.

Another essential advantage which results from this arrangement, is that the pedal 2 having only a minimum height of travel, can be arranged at a few centimetres only from the ground, thus allowing the operator to tread on it with his whole weight, without having to lift his foot very high nor to shift his body to a great height. This rational utilization of his physical effort, which is reduced to the minimum, is the more valuable inasmuch as it applies to an operation which may have to be repeated up to 10,000 times a day.

This result can be obtained also by the aid of levers forming a hinged parallelogram. (Figure 3). These two levers 21 and 22 have their pivots at 23 and 24 and carry the cranked pedal lever 2 at their free extremities by the aid of pins 25 and 26. A spring 28 allows of compensating the weight of the system and returning it to its position of rest.

The pedals previously described give the best results when the operator works standing up.

When the operator works seated, using the pedals as already described, it is no longer possible for him to transmit his effort in a rational manner. Figure 4 represents an arrangement of pedals in accordance with the invention which is particularly adapted for seated work. It is based upon the consideration that the operator having to sit in a straight position, the only one which allows him to bring the work-pieces conveniently to the electrodes must quite naturally have his legs slightly stretched out towards the front. This is indeed the case both for the known systems of pedals and for the improved systems.

The operator can evidently rest his left foot upon a stool of convenient height, but he cannot avoid the fatigue of his right leg, which he has not only to raise but almost to paratus is located in the interior of the frame, but either behind or at the side of the transformer, of allowing a simple connection with the other parts and ready access for maintenance and inspection.

The arrangement is evidently not limited to the forms of construction which have been described, these being given only by way of example.

In particular as regards the device for the simultaneous regulation of the different welding factors there can be utilized in place of the bar 42, any suitable device allowing of determining by its various positions the respective positions of the parts to be regulated. There can for example be employed a cam or a set of cams, upon which the finger 60 is carried by the lever 6, the lever 46 or the lever 54 would abut. There might likewise be employed a cylinder provided with grooves or projections for the purpose, or again a cylinder or disc carrying not only different stops for the finger 60 carried by the lever 6, but also a series of contact studs corresponding to the steps A, B, C, D and carrying a cursor actuating the automatic switch, which may be of maximum-current relay type or any other.

The above examples have been described in their application to a machine for spot welding, but it is obvious that the invention can be applied to machines for edge-to-edge welding or continuous work.

What I claim is:

1. An electric welding machine, comprising a movable electrode, lever means for bringing the said movable electrode in contact with the work piece, another lever means for then coming automatically in operation and for producing the desired pressure of the said electrode upon the work, and means for actuating both of said lever means.

2. In an electric welding machine as claimed in claim 1, the provision of means, adapted to produce, through the movable electrode, upon the work, an adjustable pressure, independently of the stroke of the electrode.

3. In an electric welding machine as claimed in claim 1, the provision of means for automatically rendering both lever means fast with one another, when the first named lever means has brought the electrode in contact with the work.

4. An electric welding machine, comprising a movable electrode, lever means for bringing the said movable electrode in contact with the work piece, another lever means for then coming automatically in operation and for producing the desired pressure of the said electrode upon the work, and pedal means for actuating both said lever means.

5. An electric welding machine, comprising a movable electrode, lever means for bringing the said movable electrode in contact with the work piece, another lever means for then coming automatically in operation and for producing the desired pressure of the said electrode upon the work, and means for actuating both of said lever means, said means comprising pedal levers, adapted to remain parallel to themselves, during the actuation movements of the lever means.

6. An electric welding machine, comprising a movable electrode, lever means for bringing the said movable electrode in contact with the work piece, another lever means for then coming automatically in operation and for producing the desired pressure of the said electrode upon the work, and means for actuating both of said lever means, said means comprising pedal levers, providing a hinged parallelogram.

7. An electric welding machine, comprising a movable electrode, lever means for bringing the said movable electrode in contact with the work piece, another lever means for then coming automatically in operation and for producing the desired pressure of the said electrode upon the work, and means, comprising a system of double pedals, adapted to respectively actuate and release both of said lever means.

8. In an electric welding machine as claimed in claim 1, the provision of means for adjusting the pressure of the electrode upon the work piece, of means for adjusting the duration of flow of the welding current and of means for adjusting the intensity of said current, and of a single controlling member for the said three adjusting means.

In testimony whereof I have signed my name to this specification.

DAVID SCIAKY.

hold up in the air between successive welding operations, when the pedal is to be left free.

The pedal represented in Figure 4 is formed by a triple lever, of which two arms each carry a pedal 29 and 30. The third arm 31 serves to pull upon the cable 14 guided over the pulleys 32 and 15. A bar 33 carries on the other hand the axle 34 of the triple lever.

In the pillar 35, integral with the bar 33 there is introduced the stem 36 supporting the seat 37. A screw 38 adapted for clamping the stem 36 against the pillar 35, allows of fixing the seat at the convenient height after adjustment. The right end of the bar 33 is provided with a slot 33a which allows of fixing the seat 37 at a convenient distance from the electrodes 1 and 1a, by the displacement of the group including the said seat in relation to the studs 39 and 40 fixed to the frame 41. This fixing is locked by the two nuts 42.

The distance between the seat and the pedals is adjusted in such a way as to allow the operator to extend his right leg with the knee bent at the moment when it is desired to exert the requisite pressure of the electrode upon the workpiece. On the other hand, the seat is provided with a back-rest which can sustain a great portion of the reaction.

The operator, occupying the seat 37, rests the feet upon the pedals 29 and 30. By pressing upon the pedal 29, he causes the movable electrode to bear upon the workpiece, and by pressing upon the pedal 30 he returns the system to the position of rest. The two legs being balanced by their respective weights, the periods of dwell between the weldings cannot fatigue the operator.

The arrangement allowing the simultaneous regulation of the different welding factors, which arrangement may be utilized or not with devices previously described, includes a flat bar 42 provided at its two ends with a certain number of notches or steps A, B, C, D, and $A^1$, $B^1$, $C^1$, $D^1$. A slot 43 allows this bar to travel laterally by sliding over a fixed stud 44. A pin 45, fixed on the bar 42 effects the connection of the bar with the upper arm 46 of a lever having its pivot 48 upon the stationary insulating plate 49. The other arm 47 carries at its extremity an insulated copper cursor 50 which by the movement of the lever can be placed at will on the contact studs $A'$, $B'$, $C'$, $D'$.

The stud 44 and the pivot 48 serve as support at the same time as guides for the bar 42.

At 51 there is represented diagrammatically an apparatus of the known type operating automatically for cutting off the current. This apparatus is such that the duration of the passage of the current depends mainly on the height $h$ at which there is set a head 52, the stem 53 of which is guided in the frame 51 and enters the interior of the apparatus.

The lever 54 having its pivot at 55 is urged downwardly by the spring 56 so that its nose 54a tends to depress the head 52. It carries at its extremity a pin 57 which strikes against one of the upper steps $A^1$ $B^1$ $C^1$ $D^1$ of the bar 42. These steps determine therefore the height $h$ of the head 52.

Moreover the highest position that the member 11 can attain is limited by the step A, B, C, D which faces it.

The contact studs $A'$, $B'$, $C'$ and $D'$ constitute the various contact connections for the primary winding of the transformer (not shown) of the welding machine. These contact studs allow of varying the ratio of transformation in the customary manner, and therefore the secondary voltage, that is to say the voltage at the electrodes.

The lever 47 is extended downwards and its end can be placed in line with the marks I, II, III, IV. Below these marks, there can be inscribed the different kinds of welding work which can be carried out.

The operator has therefore only a single part to regulate and to set in front of the marks in order to carry out the desired work.

Instead of inscribing the types of work beneath the marks, they can be grouped upon a table provided with the numbers of these latter.

In the example of construction described above, the number of notches or steps, A, B, C, D and the number of contact studs $A'$, $B'$, $C'$, $D'$, have been limited to four in each case; it is obvious that this number can be increased or decreased according to requirements.

A second modification of this example of construction of the regulating device is indicated in Figure 7, where the steps A, B, C, D, E and F succeed one another in a discontinuous manner as well as $A^1$, $B^1$, $C^1$, $D^1$; this is advantageous having regard to the fact that certain welding operations necessitate for example a fairly high electrode pressure and a relatively long duration of current passage, other operations being carried out in the same conditions of intensity and duration but with a lower pressure at the electrodes.

The devices described can be provided without an automatic switch. It suffices for this purpose to suppress or remove from the bar 42 or the member taking its place, the part which actuates the automatic switch.

This latter, in the case where it is employed, is arranged according to the invention in the interior of the frame of the welding machine, nearly above the transformer. This arrangement has the advantage, as compared with known mountings, where the ap-